(12) United States Patent
Puri et al.

(10) Patent No.: US 6,751,622 B1
(45) Date of Patent: Jun. 15, 2004

(54) GENERIC HIERARCHICAL STRUCTURE WITH HARD-PEGGING OF NODES WITH DEPENDENCIES IMPLEMENTED IN A RELATIONAL DATABASE

(75) Inventors: Arvind Nath Puri, Pleasanton, CA (US); Hans Egil Haugerud, Millbrae, CA (US)

(73) Assignee: Oracle International Corp., Redwood Shores, CA (US)

( * ) Notice: Subject to any disclaimer, the term of this patent is extended or adjusted under 35 U.S.C. 154(b) by 0 days.

(21) Appl. No.: 09/234,964

(22) Filed: Jan. 21, 1999

(51) Int. Cl.[7] .......................... G06F 17/00; G06F 17/30
(52) U.S. Cl. ................. 707/101; 707/102; 707/104.1
(58) Field of Search .................. 707/10, 101, 102, 707/104, 1, 100, 104.1; 705/7–10

(56) References Cited

U.S. PATENT DOCUMENTS

| | | | | |
|---|---|---|---|---|
| 4,383,298 A | * | 5/1983 | Huff et al. | 364/300 |
| 5,216,593 A | * | 6/1993 | Dietrich et al. | 345/467 |
| 5,369,570 A | * | 11/1994 | Parad | 705/8 |
| 5,454,101 A | * | 9/1995 | Mackay et al. | 707/3 |
| 5,732,192 A | * | 3/1998 | Malin et al. | 703/2 |
| 5,767,848 A | * | 6/1998 | Matsuzaki et al. | 345/331 |
| 5,953,707 A | * | 9/1999 | Huang et al. | 705/10 |
| 5,970,496 A | * | 10/1999 | Katzenberger | 707/102 |
| 6,012,051 A | * | 1/2000 | Sammon, Jr. et al. | 706/52 |
| 6,018,741 A | * | 1/2000 | Howland et al. | 707/102 |
| 6,073,107 A | * | 6/2000 | Minkiewicz et al. | 705/7 |
| 6,105,062 A | * | 8/2000 | Andrews et al. | 709/223 |
| 6,356,902 B1 | * | 3/2002 | Tan et al. | 707/10 |

* cited by examiner

Primary Examiner—Vincent Millin
Assistant Examiner—Ella Colbert
(74) Attorney, Agent, or Firm—Young Law Firm, P.C.

(57) ABSTRACT

A computer-implemented method of managing hierarchically related and heterogeneous data structures includes the steps of separating the data structures from hierarchical information interrelating the data structures and representing and storing the hierarchical information as a nodal tree structure. The nodal tree structure includes a first node and a plurality of second nodes, each node being in a parent-child relationship with at least one other node. The data structures are stored separately from the nodal tree structure and each of the first node and the plurality of second nodes references one of the data structures. Each of the second nodes is a child node, and each child node has a respective parent node selected from among the first node and the plurality of second nodes. Each of the second nodes includes a dependency attribute indicative of a dependency relationship of the child node with its respective parent node. Applications accessing the data structures may be configured to enforce the dependency relationships based upon the dependency attributes. In this manner, heterogeneous but related data structures such as operation sequences, scheduling and costing data may be collectively referenced by a single hierarchical structure.

17 Claims, 3 Drawing Sheets

| Name | Description |
|---|---|
| NODE_ID | Node identifier |
| ORGANIZATION_ID | Organization Identifier |
| NODE_TYPE | Type of Node |
| NODE_NAME | Name of Node |
| TOP_NODE_ID | Top-Node Identifier |
| PARENT_NODE_ID | Parent Node identifier |
| DEPENDENT | Relationship Between Parent and Child |
| LEVEL_NUMBER | Level of Node In Hierarchy. Top Node Is Level 1 |
| LAST_UPDATE_DATE | Date of Last Update |
| LAST_UPDATE_BY | Name of Person to Last Update Node |
| CREATION_DATE | Date Node Last Created |
| CREATED_BY | Name of Person to Create Node |
| LAST_UPDATE_LOGIN | Login of Person to Last Update Node |
| ATTRIBUTE 1 | Generic Field |
| ATTRIBUTE 2 | Generic Field |
| ATTRIBUTE n-1 | Generic Field |
| ATTRIBUTE n | Generic Field |

*FIG. 3*

GENERIC HIERARCHICAL STRUCTURE WITH HARD-PEGGING OF NODES WITH DEPENDENCIES IMPLEMENTED IN A RELATIONAL DATABASE

BACKGROUND OF THE INVENTION

1. Field of the Invention

This invention relates to computer-implemented methods of managing large amounts of interrelated and heterogeneous data. In particular, the present invention relates to hierarchical data structures and to methods and computer systems for organizing and managing and using such hierarchical data structures.

2. Description of the Related Art

Large projects, undertakings and organizations typically necessitate a correspondingly large information infrastructure. This information infrastructure may include a large amount of hierarchically related data. For example, the construction or repair of complicated machinery, complex civil engineering projects and the large corporations often use separate hierarchical data structures to represent scheduling, the organization of human resources, job costing and the like.

Scheduling software, for example, may store job-scheduling information in a tree-like structure. The nodes of the tree structure may be related to one another, in that lower-level tasks typically must be completed before higher-level jobs can be started or completed. A delay in a lower-level task may push forward the completion date of the higher-level job, for example. Similarly, separate accounting software applications may track item and job costs in one or more hierarchical data structures with which the cost of manufacturing, modifying or storing items, for example, is tracked across the manufacturing facility or work flow. Labor costs may be tracked in similar separate structures, as may be other types of inter-related data.

Existing hierarchical data representations and the methods of managing such data representations suffer from a number of disadvantages that become increasingly apparent as the size and complexity of such data structures increases. In the case of scheduling software, for example, when a single job or operation within the hierarchy is modified, delayed or canceled, the estimated start and completion dates of all subsequent operations must typically be serially re-computed before, for example, the final completion date of the project can be made available. Similarly, should the cost of any individual sub-assembly of a larger manufactured item change, the cost of the entire item must be re-calculated by traversing the entire hierarchical structure and re-computing all costs in the structure to account for the changed cost of the sub-assembly. As hierarchical structures may include thousands of nodes, this organization and approach is believed to be both time consuming and a less than optimal use of computing resources.

Moreover, large organizations typically rely on a plurality of separate hierarchical structures to represent and manage different facets of a same high level undertaking, including, for example, costing information, scheduling information, work flow, assembly and/or repair of complex machinery and the like. Separate hierarchical structures, therefore, have typically been required for each separate data type. The activities such separate structures represent are, however, related to one another in the real world. Indeed, the accounting department may need to interrelate scheduling, costing, resources and labor costs, to insure that sufficient funds are available at key points in time to meet staged deliverables, payroll or accounts payable for example. However, no single conventional hierarchical structure, method or system for managing same, it is believed, has had the ability of representing heterogeneous but related data structures in a single hierarchy.

What is needed, therefore, are novel forms of data organizations and methods of managing related information that allow for a more efficient use of computing time and resources in maintaining large hierarchical data structures. Also needed are means and methods that allow heterogeneous but related data structures to be represented by a single hierarchical structure. For example, there has been a long felt need for data structures and data management methods that would allow heterogeneous data and related structures such as, for example, costing and scheduling information, to be represented by a single hierarchical data structure that may be used by diverse applications. Preferably, such data structures and data management methods would permit users to flexibly modify, duplicate, mirror or delete portions of the hierarchical structure without expending unacceptable bandwidth, computing time or resources.

SUMMARY OF THE INVENTION

It is an object of the present invention, therefore, to allow for a more efficient use of computing time and resources in maintaining large hierarchical data structures. It is a further object of the invention to allow heterogeneous and related data structures to be represented in a single hierarchical structure. It is a still further object of the present invention to allow, for example, costing and scheduling information to co-exist within a single hierarchical data structure, and to allow more flexible methods of modifying, duplicating mirroring or deleting portions of the hierarchical structure.

In accordance with the above-described objects and those that will be mentioned and will become apparent below, a computer-implemented method of managing hierarchically related and heterogeneous data structures, according to an embodiment of the present invention, comprises the steps of separating the data structures from hierarchical information interrelating the data structures and representing and storing the hierarchical information as a nodal tree structure. The nodal tree structure includes a first node and a plurality of second nodes, each node being in a parent-child relationship with at least one other node. The data structures are stored separately from the nodal tree structure and each node references one of the data structures. As all dependency relationships between the data structures are stored in the nodal tree structure, the same tree structure may represent the dependency relationships between data structures of different types.

BRIEF DESCRIPTION OF THE DRAWINGS

For a further understanding of the objects and advantages of the present invention, reference should be made to the following detailed description, taken in conjunction with the accompanying figures, in which:

FIG. 3 shows an example of a structure of a node of a hierarchical structure according to an embodiment of the present invention.

DESCRIPTION OF THE PREFERRED EMBODIMENTS

HARDWARE OVERVIEW

Figure 4:
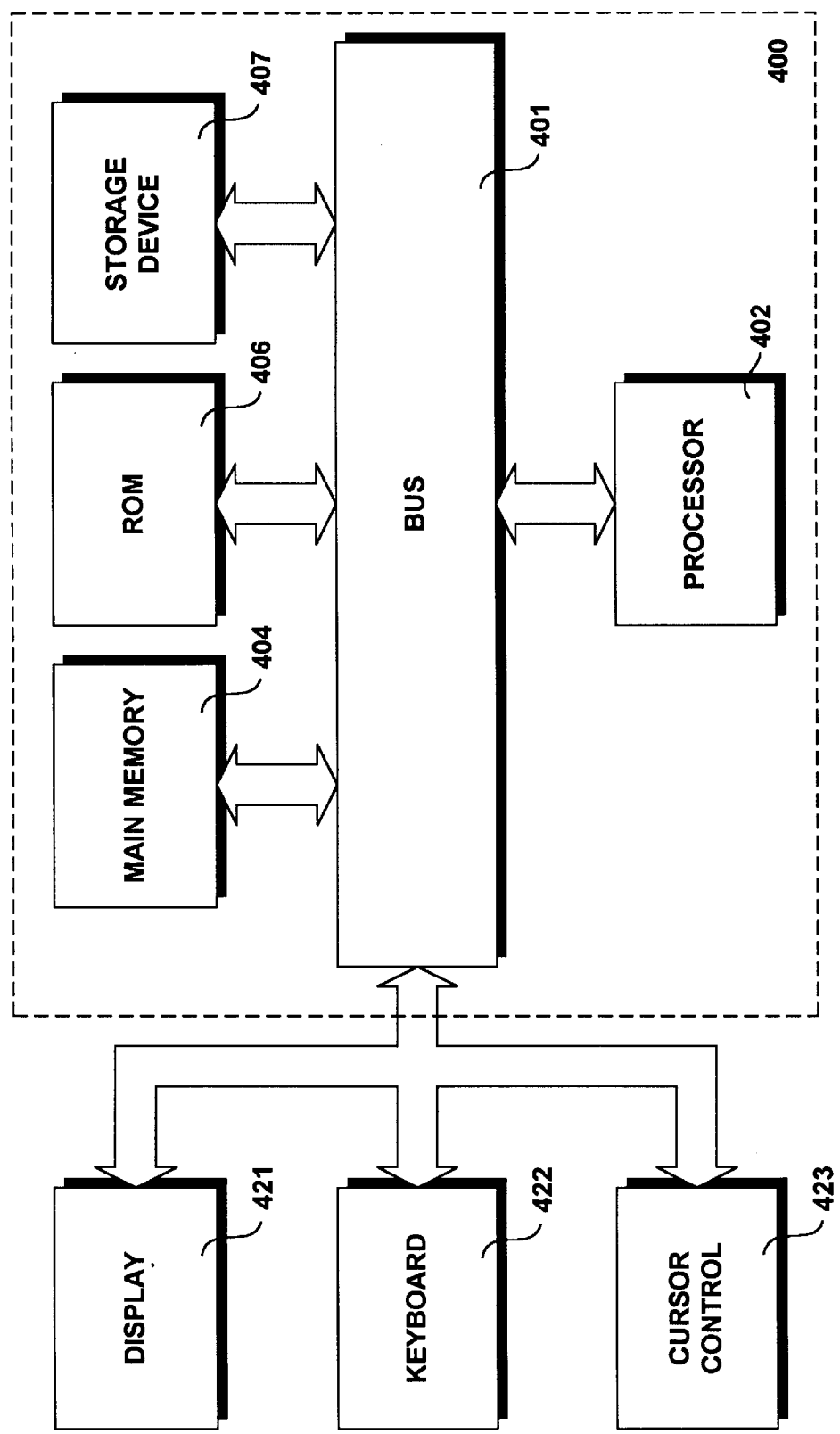
FIG. 4 illustrates a block diagram of a computer system upon which an embodiment of the present invention may be implemented.

FIG. 4 illustrates a block diagram of a computer system 400 upon which an embodiment of the present invention may be implemented. Computer system 400 includes a bus 401 or other communication mechanism for communicating information, and a processor 402 coupled with bus 401 for processing information. Computer system 400 further comprises a random access memory (RAM) or other dynamic storage device 404 (referred to as main memory), coupled to bus 401 for storing information and instructions to be executed by processor 402. Main memory 404 also may be used for storing temporary variables or other intermediate information during execution of instructions by processor 402. Computer system 400 also includes a read only memory (ROM) and/or other static storage device 406 coupled to bus 401 for storing static information and instructions for processor 402. A data storage device 407, such as a magnetic disk or optical disk, is coupled to bus 401 for storing information and instructions.

Computer system 400 may also be coupled via bus 401 to a display device 421, such as a cathode ray tube (CRT), for displaying information to a computer user. An alphanumeric input device 422, including alphanumeric and other keys, is typically coupled to bus 401 for communicating information and command selections to processor 402. Another type of user input device is cursor control 423, such as a mouse, a trackball, or cursor direction keys for communicating direction information and command selections to processor 402 and for controlling cursor movement on display 421. This input device typically has two degrees of freedom in two axes, a first axis (e.g., x) and a second axis (e.g., y), which allows the device to specify positions in a plane.

Alternatively, other input devices such as a stylus or pen may be used to interact with the display. A displayed object on a computer screen may be selected by using a stylus or pen to touch the displayed object. The computer detects the selection by implementing a touch sensitive screen. Similarly, a light pen and a light sensitive screen may be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 422 wherein all interface is provided via the stylus as a writing instrument (like a pen) and the written text is interpreted using optical character recognition (OCR) techniques.

The present invention is related to the use of computer system 400 to provide a generic hierarchical structure with hard-pegging of nodes with dependencies implemented in a relational database. According to one embodiment, the hierarchical structure is provided by one or more computer systems 400 in response to processor(s) 402 executing sequences of instructions contained in memory 404. Such instructions may be read into memory 404 from another computer-readable medium, such as data storage device 407. Execution of the sequences of instructions contained in memory 404 causes processor(s) 402 to perform the process steps that will be described hereafter. In alternative embodiments, hard-wired circuitry may be used in place of or in combination with software instructions to implement the present invention. Thus, the present invention is not limited to any specific combination of hardware circuitry and software.

FUNCTIONAL OVERVIEW

Figure 1:
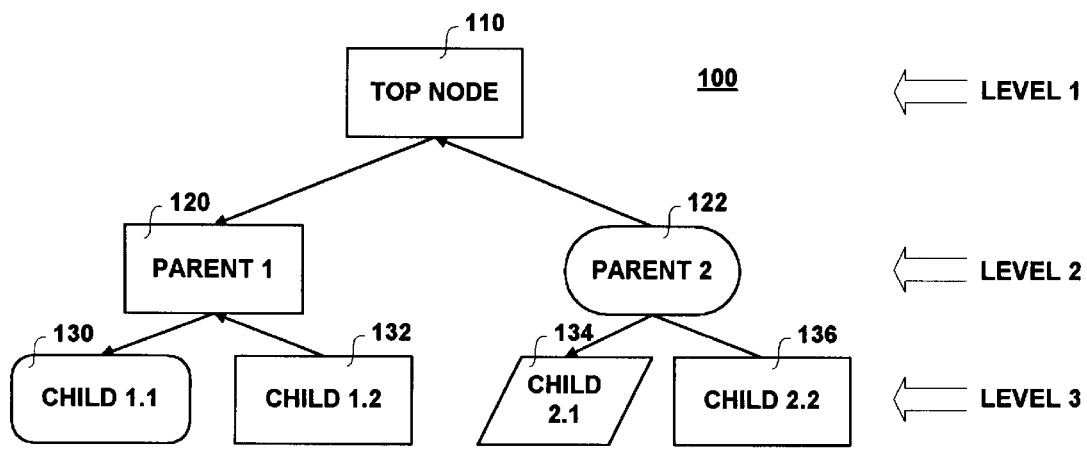
FIG. 1 is a block diagram of a hierarchical structure according to an embodiment of the present invention.

FIG. 1 shows an embodiment of a hierarchical structure 100 according to an embodiment of the present invention. The structure shown in FIG. 1 is a deliberately simplified hierarchy to illustrate the principles of the present invention, it being understood that the invention described herein is not to be limited thereto. The hierarchical structure 100 includes a plurality of nodes 110, 120, 122, 130, 132, 134 and 136. The hierarchy 100 may be divided into a top node, parent nodes and child nodes. The top node 110 (hereafter "Top Node") is the top of the hierarchy 100. The Top Node does not have any parent node. Two parent nodes 120 and 122 (hereafter "Parent 1" and "Parent 2", respectively) occupy level 2 of the hierarchy, the Top Node residing at level 1. According to the present invention, a parent node may generically be thought of as a node that occupies a next higher level in the hierarchy and that is connected to the current node. As shown in FIG. 1, the Parent 1 node has two children nodes at reference numerals 130 and 132 (hereafter "Child 1.1" and "Child 1.2", respectively). Similarly, Parent 2 has two children nodes at reference numerals, 134 and 136 (hereafter "Child 2.1" and "Child 2.2", respectively). A child node, according to the present invention is a node that occupies a next lower level in the hierarchy and that is connected to the current node. The Child 1.1, Child 1.2, Child 2.1 and Child 2.2 nodes occupy level 3 of the hierarchy shown in FIG. 1. In turn, the nodes Child 1.1, Child 1.2, Child 2.1 and Child 2.2 may be parents to further children (not shown), at hierarchically lower levels, albeit such children of Child 1.1, Child 1.2, Child 2.1 and Child 2.2 will occupy level associated with higher numbers, such as levels 4, 5, 6 etc. Thus, parent-child relationships, according to the present invention, indicate relative levels between the nodes 110, 120, 122, 130, 132, 134 and 136 in the hierarchy 100.

The hierarchical tree structure 100 according to the present invention not only allows for the above-described parent-child relationships, but also allows for hard-pegging (i.e., strict enforcement) of dependencies between parent and children nodes to be encoded therein. Indeed, as shown in FIG. 1, the direction of the arrows joining the nodes 110, 120, 122, 130, 132 and 134 indicates the type of dependency between the Top Node, the Parent 1 and Parent 2 nodes, as well as the dependencies between the Parent 1 and Child 1.1 and Child 1.2 and between Parent 2 and Child 2,1 nodes. The dependency attribute encoded in the hierarchy 100 dictates the manner in which one node is related to another node in the hierarchy. As shown in FIG. 1, the execution of the Top Node is dependent upon the prior execution of the Parent 1 node, the direction of the arrow indicating the dependency. On the other hand, execution of the Parent 2 node is predicated upon the prior execution of the Top Node. Likewise, the execution of the Parent 1 node is predicated upon prior execution of the Child 1.1 node, whereas the Parent 1 node must be executed prior to the execution of the Child 1.2 node. Similarly, the Child 2.1 node must be executed before the Parent 2 node may be executed. According to the present invention, the term "execute" is used in a broadly inclusive manner. Indeed, according to the present invention, the term "execute" embraces the concepts of carrying out of a job operation sequence, entering, validating or invalidating data or, more generally, satisfying or failing to satisfy some criterion or criteria.

The dependency attribute may be encoded in each node 110, 120, 122, 130, 132, 134 and 136 of the hierarchy 100. Indeed, each node 110, 120, 122, 130, 132, 134 and 136 may be encoded with a single dependency attribute, such as PARENT, CHILD or INDEPENDENT. According to the present invention, the dependency attribute dictates the order of execution of any node with respect to its parent node. For example, according to the present invention, the Parent 1 node is encoded with a CHILD dependency attribute, meaning that the execution of the parent's (Top Node) operation sequence is dependent upon the prior completion of the Child's (Parent 1) operation sequence. On the other hand, the Parent 2 node may be encoded, as shown in FIG. 1, with a PARENT dependency attribute. In this case, execution of the child's (Parent 2) operation sequence is dependent upon the prior completion of the parent's (Top Node) operation sequence. That is, for example, the operation sequence specified in the Top node must be complete before the operation sequence specified in the Parent 2 node may be initiated. Following the same logic, the Child 1.1 node is encoded with a CHILD dependency attribute, the Child 1.2 node is encoded with a PARENT dependency attribute and the Child 2.1 node is encoded with a CHILD dependency attribute. As the Child 2.2 node is not connected to its parent node (Parent 2) by an arrow, its dependency attribute is INDEPENDENT, meaning that the executions of the Parent 2 and Child 2.2 nodes are mutually independent.

This hard-pegging of dependencies gives the hierarchy 100 according to the present invention a number of advantages over conventional hierarchical structures, in that the tree structure may be traversed in either a top-down or bottom-up direction while preserving the dependency relationships between the nodes 110, 120, 122, 130, 132, 134 and 136. For example, each of the nodes 110, 120, 122, 130, 132, 134 and 136 may reference data structures relating to a complex piece of equipment, for example. Traversing the tree 100 in a top-down direction, i.e., from the Top Node 110 toward the children nodes Child 1.1, Child 1.2, Child 2.1 and Child 2.2 may be related to the disassembly process, whereas traversal of the tree 100 in a bottom-up direction (from the children nodes Child 1.1, Child 1.2, Child 2.1 and Child 2.2 toward the Top Node) may be related to a subsequent re-assembly of the same piece of equipment. In that case, each node may reference a data structure of a job having a particular operation sequence related to, for example, individual parts or complex sub-assemblies. As the relative dependencies are maintained by the dependency attributes encoded at each node, the correct sequence of execution is maintained irrespective of the direction of traversal of the hierarchical structure 100.

Another advantage of the hard-pegging of dependencies in the hierarchical structure 100 of FIG. 1 is that work or operations may be carried out at any of the nodes 110, 120, 122, 130, 132, 134 and 136, rather than at the lowest nodes (also called the "leaves" of the tree) in the hierarchy 100. Indeed, as the dependency information between nodes is hard-pegged at the nodal level, any pre-requisite execution will be evident upon consulting the encoded dependency attribute of the node to be executed. For example, with reference to FIG. 1, work may be carried out directly on the Parent 1 node, without first necessarily executing both the Child 1.1 and the Child 1.2 nodes. Indeed, examination of the Parent 1 dependency attribute reveals a CHILD dependency attribute, meaning that execution of the Top Node is predicated upon prior execution of the Parent 1 node. However, execution of the Parent 1 node may itself be predicated upon the prior execution of another node, such as the Child 1.1 node, which has a CHILD dependency attribute, meaning that the Parent 1 node is dependent on the prior execution of the operation sequence referenced by its child node Child 1.1. The Parent 2 node is also executable, subject to the prior execution of the Top Node, as the dependency attribute of Parent 2 is PARENT, meaning that execution of the parent's (Top Node) operation sequence must be completed before execution of the child's (Parent 2) operation sequence may be initiated. Moreover, the Parent 2 node may not be directly executable if it is dependent upon the prior execution of one of its children nodes, such as node Child 2.1.

The nodes 110, 120, 122, 130, 132, 134 and 136 of the hierarchical tree structure 100 according to the present invention may reference heterogeneous types of data elements. In FIG. 1, the heterogeneous data elements are schematically represented by the shapes of the boxes schematically representing the nodes 110, 120, 122, 130, 132, 134 and 136. For example, Child 1.1 may be a node of type "Purchase Order", whereas the Parent 1 node may be of type "Assembly Job". A single hierarchy, according to the present invention, may represent real-world constraints between heterogeneous but related elements, undertakings or business activities, for example. Indeed, the hierarchy 100 according to the present invention may represent the real world constraint that an item ordered via a purchase order must be received before its assembly can begin. According to the present invention, these constraints are represented by making the execution of a node of type Purchase Order a pre-requisite to the execution of another node of type Assembly Job. In terms of FIG. 1, relationship may be represented by the nodes Parent 1 and Child 1.1. Indeed, the node Child 1.1 of type Purchase Order is made a parent of the node Parent 1 of type Assembly Job. Moreover, the dependency attribute of the Parent 1 node may be chosen to be CHILD, thereby making the execution of the Child 1.1 node of type Purchase Order a pre-requisite to the execution of the Parent 1 node of type Assembly job.

That the hierarchical tree structure 100 may represent dependency information between nodes representing heterogeneous elements is possible because, according to the present invention, the hierarchical nodal structure 100 is wholly separate from the data referenced by the constituent nodes of the hierarchy. An embodiment of the present invention is shown in the block diagram of FIG. 2. The same hierarchical tree structure and dependency relationships between nodes shown in FIG. 1 are maintained in FIG. 2, the hierarchy 100 of FIG. 1 being represented in FIG. 2 in simplified nodal form. According to the present invention, to separate the hierarchical structure 100 from the data structures referenced by the nodes 110, 120, 122, 130, 132, 134 and 136, each of the nodes 110, 120, 122, 130, 132, 134 and 136 includes a pointer (which pointer may be unique, but need not be) to a data structure stored in one or more data storage devices 230. Indeed, the hierarchy structure 100

Prior to a further description of the further advantages of separating the hierarchical tree structure from the data structures referenced thereby, reference will be made to FIG. 3, which shows an example of the structure of a node 110, 120, 122, 130, 132, 134 or 136 according to an embodiment of the present invention. As shown in FIG. 3, each node 110, 120, 122, 130, 132, 134 and 136 may have a structure including a number of fields. In FIG. 3, the names of the fields are found in the left hand column of the table and the descriptions thereof are found in the right hand column. It is to be understood that the structure shown in FIG. 3 is but one of many possible structures for the nodes 110, 120, 122, 130, 132, 134 and 136, and the present invention is not to be limited thereto.

Figure 2:
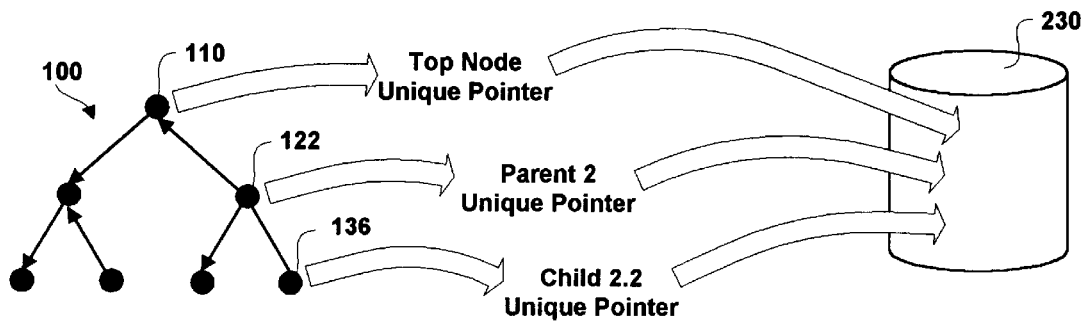
FIG. 2 is a block diagram of an embodiment of the present invention.

The NODE_ID field is a unique internal identifier of the node within the hierarchy 100. The ORGANIZATION_ID is an organization identifier that may indicate, for example, the company, resources or people represented by the hierarchy 100. The hierarchy 100 of FIG. 1 is generic as to the type of data structures referenced by its constituent nodes. Therefore, it is necessary to indicate, in each node, the type of data structure referenced by that node. The NODE_TYPE field discharges this function, by designating the type of data structure referenced by the node. For example, the NODE_TYPE may be of type "Job" for a multi-operation job, or may be of type "Purchase Order", for purchase order. A virtually unlimited number of data structure types may be defined and referenced by the NODE_TYPE field. For example, the node could be of type "Orgchart" if the node references data for an organization chart. In an object-oriented database environment, the data structures may be objects, such as "Job Object", "Purchase Order Object" or "Orgchart Object", for example. The next field, NODE_NAME, indicates the name of the node. For example, the NODE_NAME may be a unique "Job_ID" for a job hierarchy or may be a unique "Employe_Number" in the case wherein the node references a corporate organization chart. A node in a hierarchy according to the present invention may be uniquely identified either by its NODE_NAME or its NODE_ID. Together, the NODE_TYPE and NODE_NAME may be used as a unique pointer to the data structure referenced by the node, as shown in FIG. 2. Alternatively, other combinations of fields or another single field altogether may be used as a pointer to a corresponding data structure, the present invention not being limited to the embodiment wherein the combination of NODE_TYPE and NODE_NAME uniquely point to the corresponding and separately-stored data structure.

According to an embodiment of the present invention, each node 110, 120, 122, 130, 132, 134 and 136 stores at least two pieces of information concerning other nodes in the hierarchy 100. One such piece of information is the node identifier of the Top Node in the hierarchy, such as is shown at 110 in FIG. 1. According to the present invention, the Top Node of each hierarchy 100 preferably includes information that is valid for all nodes of the hierarchy. Storing the node identifier of the Top Node provides each node 110, 120, 122, 130, 132, 134 and 136 within the hierarchy with a mechanism for quickly accessing the Top Node of the hierarchy 100 and retrieving the commonly valid information stored therein. Quickly accessing the Top Node through the stored Top Node identifier thus facilitates navigation and traversal of the hierarchy 100. According to the present invention, the second piece of information stored in each of the nodes 110, 120, 122, 130, 132, 134 and 136 is the node identifier of its parent node. This information may be stored in the PARENT_NODE_ID field. As the Top Node does not have a parent node, this field may be blank or may be self-referential—that is, the field may reference the TOP_NODE_ID. According to the present invention, therefore, each node 110, 120, 122, 130, 132, 134 and 136 may include information relative to the identifier of the Top Node and information relative to its parent node.

The dependency information between parent and child nodes 110, 120, 122, 130, 132, 134 and 136, according to the present invention, is stored within the DEPENDENT field. For example, if execution of the current node is dependent upon the prior execution of the operation sequence of a child node, the DEPENDENT field of its child node would store the dependency attribute CHILD. On the other hand, if the execution of the current node is predicated upon the prior execution of a parent node, the DEPENDENT field of the current node would store the PARENT dependency attribute. Alternatively still, if the execution of the current node is not dependent upon the prior execution of either its parent node or a child node, the dependency attribute INDEPENDENT would be stored in the DEPENDENT field of the current node.

FIG. 1 shows an exemplary hierarchical structure 100 having a Top Node, two parent nodes Parent 1 and Parent 2 and four children nodes Child 1.1, Child 1.2, Child 2.1 and Child 2.2. Therefore, three levels of hierarchical structure are shown in FIG. 1, referenced by the three arrows labeled "Level 1", "Level 2" and "Level 3" (the arrows are present for illustrative purposes only and do not form any part of the hierarchy 100). This level information may be stored in the LEVEL field shown in FIG. 3. The LAST_UPDATE_DATE, the LAST_UPDATED_BY, the CREATION_DATE, the CREATED_BY, and the LAST_UPDATE_LOGIN fields of the node structure of FIG. 3 store information relative to the last update date, the name of the person to last update the node, the date at which the node was created, the name of the person who created the node and the login of the person to last update the node, respectively. These fields may be substantially changed, re-ordered or omitted altogether, depending upon the need and perceived importance of such information. The next fields, labeled ATTRIBUTE 1, 2, n–1 and n are user-definable flexible fields in which the user may store any other relevant information specific to the technological or business field or industry to which the present invention is applied. Alternatively, usage of the fields ATTRIBUTE 1, 2, n–1 and n may arise from the need to store additional NODE_TYPE-specific information.

As is clear from the structure of the nodes 110, 120, 122, 130, 132, 134 and 136, the nodes themselves preferably do not store any of the data structures (and preferably do not store any portion of the data structures) by the hierarchical tree 100. Such data structures, according to the present invention, are preferably stored separately (i.e., at different logical addresses, for example) from the hierarchical tree structure 100. Indeed, the hierarchical structure 100 and the data structures referenced by the structure 100 may be stored at mutually different logical addresses within the same storage device or on wholly different storage devices, which may be, in turn, co-located and accessed by a same data processor device or devices or separated by, for example, a public, private or hybrid network and accessed by different data processors.

One of many the real world uses of the present invention relates to the representation of scheduling and costing information via the hierarchical tree and associated data structures. For example, the hierarchical tree structure 100 may represent the hierarchy and dependency information regarding, for example, the maintenance of complex equipment, such as aircraft engines. Typically, the maintenance of such complex equipment requires scrupulous record keeping as well as a great deal of physical resources, such as materials and labor. Moreover, such complex undertakings generally require a strict timetable of deliverables, many of which, from a data-processing point of view, may be of different data types. In that case, the hierarchical nature of a typical disassembly, clean and repair process lends itself well to representation in a hierarchical tree structure according to the present invention, such as shown in FIG. 1. Indeed, the data structures referenced by the nodes 110, 120, 122, 130, 132, 134 and 136 may include scheduling information such as start and end dates, costing information such as the cost of materials and the cost of labor, sales and purchase orders, disassembly or re-assembly operation sequences and other data structures of heterogeneous data types. Although the data structures referenced by the nodes 110, 120, 122, 130, 132, 134 and 136 of the hierarchical tree structure 100 may include scheduling, costing and other types of information, the hierarchical structure 100, in itself, does not generate any scheduling and/or costing information. Instead, scheduling and/or costing applications may navigate the hierarchical tree structure 100 and access the scheduling and/or costing information included in the data structures referenced by the nodes 110, 120, 122, 130, 132, 134 and 136. These scheduling and cost accounting applications perform the scheduling tasks and carry out the costing calculations, respectively. The present invention, therefore, provides the necessary infrastructure to allow such applications to provide users with the needed scheduling and costing information, for example.

As alluded to above, data structures of heterogeneous types are often related to one another. For example, one cannot perform a disassembly job before the item to be disassembled has been received. In this case, for example, the purchase order referencing the item to be received is of a different data type than the sequence of operations defining the disassembly job. Moreover, these heterogeneous data types are in a dependency relationship with one another, receipt of the item to be disassembled being a pre-requisite to its disassembly. The present invention, by separating the hierarchical tree structure and the data referenced by the hierarchy, allows for such dependency relationships between heterogeneous data elements to be represented in a single structure. Moreover, the execution of the applications operating upon the data referenced by the nodes 110, 120, 122, 130, 132, 134 and 136 of the hierarchy 100 may be constrained by the dependency information included in each node, within the DEPENDENT field shown in FIG. 2, for example. In this manner, an application operating on the data structure referenced by a node having a CHILD dependency attribute may be configured to suspend its execution until whatever condition imposed by the node's child is satisfied. For example, a disassembly application operating on a data structure referenced by a current node may not run according to the present invention until, for example, a receiving application operating on a data structure pointed to by a child node has been executed, indicating, for example, that the item to be disassembled has been received. The integrity of the entire job or business activity at hand may thus be assured by following and satisfying the dependencies encoded in the hierarchical tree structure 100 of FIG. 1 or other similar such structures.

Moreover, due to the hard-pegging of the dependency information within each of the nodes 110, 120, 122, 130, 132, 134 and 136, the hierarchical structure 100 of FIG. 1 may be traversed in either a top-down or bottom-up direction, all the while preserving the dependencies between parent and child nodes. This feature may be exploited by, for example, scheduling applications to traverse the hierarchical structure 100 to determine start and/or end dates, for example, for jobs and other business activities. Indeed, using the dependency information within the nodes 110, 120, 122, 130, 132, 134 and 136, a scheduler application may backward schedule from an end date or forward schedule from a start date by suitably traversing the hierarchical structure 100 and accessing the data structures referenced by the constituent nodes of the hierarchical tree in one or the other direction. The ability to freely traverse the tree 100 in either direction is believed to be particularly useful, for example, in complex disassembly, repair and re-assembly jobs. Indeed, a complex piece of equipment may require that its disassembly follow a precise sequence of operations, which sequence may readily be codified as a hierarchical tree structure, such as shown in FIG. 1. In this case, the Top Node of the hierarchy, such as shown at 100 in FIG. 1 may reference a data structure relating to the entire piece of equipment, whereas the "leaves" (i.e., the bottom-most nodes) of the tree may reference data structures corresponding to the constituent parts or sub-assemblies of the piece of equipment. The disassembly process may then be carried out by traversing the hierarchical tree structure in a top-down direction. After the repair job is complete, the re-assembly process may be carried out by traversing the same hierarchical tree structure in the bottom-up direction while maintaining the mutual dependencies between parents and children nodes. While traversing the hierarchical tree structure 100 in the bottom-up direction, the parent-child relationships may be reversed, notwithstanding that the dependencies therebetween are maintained irrespective of the direction of tree traversal.

Indeed, when traversing the hierarchical tree 100 in a bottom-up direction, the nodes Child 1.1, Child 1.2, Child 2.1 and Child 2.2 may be seen as Parent 1.2, Parent 1.2, Parent 2.1 and Parent 2.2 nodes, respectively. Likewise, the Parent 1 and Parent 2 nodes shown in FIG. 1 may then be thought of as the Child 1 and Child 2 nodes, respectively, whereas the Top Node may be thought of as the Bottom Node. However, the dependency information (represented in FIG. 1 as the arrows joining parent-child nodal pairs) remains unaltered by the direction of tree traversal.

Costing information may readily be included in the data structures referenced by the nodes 110, 120, 122, 130, 132, 134 and 136 of the hierarchical tree structure of 100 of FIG. 1. According to an embodiment of the present invention, actual (as opposed to standard) costing information may be collected and stored within the data structures referenced by the nodes 110, 120, 122, 130, 132, 134 and 136 of the hierarchical structure 100. Such actual costs are preferably stored in Cost Source ID data structures, as taught in commonly assigned U.S. application Ser. No. 09/235,120 entitled "Methods And Systems Enabling The Identification Of Actual Costs In A Transaction Based Financial And Manufacturing Environment", the disclosure of which is incorporated herewith by reference in its entirety.

Weights, in the form of fractional numerical coefficients, for example, may be assigned to selected nodes in the hierarchical structure 100 to allow allocation and/or splits of costs among a parent and a child node or among a parent and children nodes. For example, in the case of a service job wherein the it is desired to allocate, for accounting purposes, 60% of the costs to a parent node referencing a sequence of disassembly operations and 40% of the costs of the service job to a child node referencing a sequence of repair operations, then appropriate weight coefficients (e.g., 0.60 and 0.40) may be stored within one of the ATTRIBUTE 1–ATTRIBUTE N flexible fields, for example. In this manner, cost allocation and/or splits of costs between nodes may be effectuated, the costing application traversing the nodal structure of the hierarchy, and retrieving costs stored in the data structures referenced by the nodes and weighing the retrieved costs according to the weights, stored in the nodes of the hierarchical structure.

The hierarchical tree structure 100 according to the present invention also allows costs to be rolled up from any node to any higher-level node in the hierarchy. Indeed, by storing costs of jobs or costs of operations within a job in the data structure referenced (i.e., pointed to by the NODE_NAME and NODE_TYPE combination, for example) by each node 110, 120, 122, 130, 132, 134 and 136, efficient roll-ups of costs of lower-level business activities into higher-level business activities may be carried out. For example, in construction tasks, it is common to have both material and labor costs. These costs, heterogeneous as they may be from a data processing point of view, may nevertheless be represented by a single hierarchy according to the present invention to thus allow the costs to be aggregated and presented as the total or partial (depending upon the nodes traversed) cost of constructing an item. To do this, the costing application may traverse the hierarchy 100 and access, for example, the labor and materials costing information stored in the data structures pointed to by the traversed constituent nodes 110, 120, 122, 130, 132, 134 and 136. Costs may be aggregated as the hierarchy structure 100 is traversed, each data structure pointed to by each node contributing the cost or costs associated with a single node. In this manner, the cost contributions of constituent operations of a larger job may be aggregated up to the top-most job level (i.e., to the Top Node of the hierarchy 100, for example) or up to a selected higher-level in the hierarchy. When rolling up costs from a lower-level business activity to a higher-level business activity, the dependency information stored, for example, in the DEPENDENT field of the nodal structure shown in FIG. 2, is not used. Indeed, the costs are rolled up merely by climbing the tree following the parent-child relationships, from child to parent, until the selected higher-level node is reached. For costing applications, for example, the hierarchy 100 may be thought of as an undirected graph. Schematically, the directions of the arrows in the hierarchical tree structure 100 may be ignored for such applications.

Storing the cost contributions (or any other type of data) of each node not in the hierarchy itself but in the data structures pointed to by the hierarchy avoids the necessity of re-calculating the costs each time new nodes are added or each time costs are updated. In addition, if the costs were directly stored within the hierarchical structure itself, then a same hierarchical structure such as shown at 100 in FIG. 1 could not represent the relationships between other heterogeneous data structures. Moreover, storing the costs associated with jobs, operations or other business activities in the data structures pointed to by the nodes 110, 120, 122, 130, 132, 134 and 136 of the tree structure 100 means that a same cost can appear in many different tree structures such as the tree structure similar to that shown at 100 in FIG. 1, without, however, duplicating the data structures including such costs. Indeed, any number of nodes in any number of hierarchical tree structures may point to a same instance of a data structure. In that case, when some information in the data structure changes, it is only necessary to change that data structure to update each hierarchy referencing that data structure: it is not necessary to update each hierarchy. This leads to more efficient use of available computing resources, saved bandwidth, and faster response times.

Shifting costs or any other data from one hierarchy to another may be carried out, for example, by deleting the node referencing the data structure containing the costs or other data to be shifted from its current hierarchy and performing a cascade delete of all of the deleted node's children and by adding a node linking the shifted costs or other data to the new hierarchy. The data structure or structures including the costs or other data to be shifted need not, themselves, be moved from one location to another. To shift costs or other data from one node to another within the same hierarchy, the node referencing the costs or other data to be shifted may simply be assigned a new parent node, the data structure or structures referenced by the node remaining unmoved. In that case, all of the children nodes of the shifted node will follow the shifted node to its new location, as each node stores the identifier of its parent node.

Preferably, each of the nodes 110, 120, 122, 130, 132, 134 and 136 of the hierarchical tree structure 100 of FIG. 1 is stored as a row in a table of a relational or object-oriented database. The data structures referenced by each of the nodes 110, 120, 122, 130, 132, 134 and 136 may also be stored within a relational or object oriented database.

Thus, the framework of separate hierarchical and data structures, according to the present invention, lends itself particularly well to the representation, modeling, scheduling and costing, for example, of dynamic business activities. Large business projects, for example, rarely constitute a deterministic environment, in which all operations, jobs, scheduling and costing data are or can be predetermined. During the course of such projects, initially unforeseen jobs, operation sequences, repairs, materials and costs may be required. Alternatively, the specifications of the job itself may change, requiring corresponding changes to the data structure or data structures utilized to manage the organization of the job. The present invention, by separating the hierarchical structure from the data referenced by the hierarchy and by hard-pegging parent-child dependencies, for example, addresses these issues by providing an infrastructure in which large dynamic data systems may be maintained with ease and economy of resources.

While the foregoing detailed description has described preferred embodiments of the present invention, it is to be understood that the above description is illustrative only and not limiting of the disclosed invention. For example, the structure of the nodes 110, 120, 122, 130, 132, 134 and 136 need not be exactly as depicted in FIG. 3. Indeed, those of skill in this art will recognize other alternative embodiments and all such embodiments are deemed to fall within the scope of the present invention. Thus, the present invention should be limited only by the claims as set forth below.

What is claimed is:

1. A computer-implemented method of managing hierarchically related and heterogeneous data structures, comprising the steps of:

separating the data structures from hierarchical information interrelating the data structures;

representing and storing the hierarchical information as a nodal tree structure, the nodal tree structure including a first node and a plurality of second nodes, each node being in a parent-child relationship with at least one other node each of the first and second nodes including a dependency attribute indicative of a dependency relationship of the child node with its respective parent node, the dependency attribute constraining applications accessing the data structures to enforce the dependency relationship, the dependency attribute being selected from the group consisting of parent, child and independent, wherein the parent dependency attribute indicates that execution of the child node is predicated upon prior execution of its parent node, the child dependency attribute indicates that execution of the parent node is predicated upon prior execution of one of its child nodes and the independent dependency attribute indicates that neither parent nor child node is dependent upon prior execution of any other node, and storing the data structures separately from the nodal tree structure, each of the first node and the plurality of second nodes referencing one of the data structures.

2. The method of claim 1, wherein at least some of the data structures include cost information for at least one activity, and wherein the method further comprises the steps of:

traversing the nodal tree structure from a selected lower level-node up to a selected higher-level node in the tree structure;

accessing the cost information in the data structures referenced by each node traversed;

aggregating the accessed cost information, and presenting the aggregated cost information as a cost of carrying out said at least one activity.

3. The method of claim 1, further comprising the step of assigning a weight coefficient to selected ones of the first and the plurality of second nodes.

4. The method of claim 3, wherein at least some of the data structures include cost information for at least one activity, and wherein the method further comprises the steps of:

traversing the tree structure from a selected lower-level node to a selected higher-level node in the tree structure;

accessing the cost information in the data structures referenced by each node traversed;

aggregating the accessed cost information, the assigned weight coefficients weighting a cost contribution of each of the data structures, and presenting the aggregated cost information as a cost of said at least one activity.

5. The method of claim 1, wherein at least some of the data structures include scheduling information for an activity to be performed and wherein the method further comprises the step of:

traversing the tree structure in one of a top-down and bottom-up direction, and accessing the scheduling information to determine one of a completion date and a start date, respectively, of the activity and presenting one of the start and end dates of the activity.

6. The method of claim 1, wherein the data structures are of heterogeneous data types, and wherein the method further comprises the step of:

storing a first pointer in each of the first and second nodes, the first pointer including a combination of node type and node name that uniquely identifies a location of one data structure.

7. The method of claim 1, further comprising the step of storing each of the first and the plurality of second nodes as a row in a table of one of a relational and object-oriented database.

8. A machine readable medium having data stored thereon representing sequences of instructions which, when executed by a computer system, cause said computer system to perform the steps of:

creating a hierarchical nodal structure, including:
a first node;
a plurality of second nodes, each of the second nodes being related to the first
node and to at least one other second node, each node being in a separate parent-child relationship with at least one other node each of the first and second nodes including a dependency attribute indicative of a dependency relationship of the child node with its respective parent node, the dependency attribute constraining applications accessing the data structures to enforce the dependency relationship, the dependency attribute being selected from the group consisting of parent, child and independent, wherein the parent dependency attribute indicates that execution of the child node is predicated upon prior execution of its parent node, the child dependency attribute indicates that execution of the parent node is predicated upon prior execution of one of its child nodes and the independent dependency attribute indicates that neither parent nor child node is dependent upon prior execution of any other node; and assigning a first pointer to each of said first and second nodes, each assigned first pointer pointing to one of a plurality of data structures stored separately from said hierarchical nodal structure, wherein the stored data structures pointed to contain no hierarchical information and wherein the created hierarchical nodal structure contains no data structures.

9. The machine readable medium of claim 8, wherein all dependency relationships between the plurality of data structures are represented in the hierarchical nodal structure.

10. The machine readable medium of claim 8, wherein said sequences of instructions further cause said computer system to perform the step of assigning a second pointer to each of the plurality of second nodes, the second pointer pointing to the first node.

11. The machine readable medium of claim 8, wherein said sequences of instructions further cause said computer system to perform the step of designating each of the plurality of second nodes to be a child node, each child node having a respective parent node selected from among the first node and the plurality of second nodes.

12. The machine readable medium of claim 8, wherein the pointer includes a combination of one of a plurality of distinct node type indications and one of a plurality of distinct node name indications, thereby allowing the hierarchical nodal structure to represent relationships between data structures of heterogeneous data types, each data type being referenced by one of the plurality of node type indications.

13. The machine readable medium of claim 8, wherein the plurality of data structures are stored in at least one database.

14. The machine readable medium of claim 8, wherein said sequences of instructions further cause said computer system to perform the step of storing the hierarchical nodal structure in a database.

15. A computer system for managing hierarchical information, comprising:

at least one processor;

at least one data storage device;

a plurality of processes spawned by said at least one processor, said processes including processing logic for storing, in said at least one data storage device, a hierarchical nodal structure, including:
a first node;
a plurality of second nodes, each of the second nodes being related to the first
node and to at least one other second node; and a plurality of data structures distinct from said hierarchical nodal structure, wherein each of the first and the plurality of second nodes includes a first pointer to one of the plurality of data structures stored in said at least one data storage device, each of the second nodes being a child node, each child node having a respective parent node selected from among the first node and the plurality of second nodes, each of the first and second nodes including a dependency attribute indicative of a dependency relationship of the child node with its respective parent node, the dependency attribute constraining applications accessing the data structures to enforce the dependency relationship, the dependency attribute being selected from the group consisting of parent, child and independent, wherein the parent dependency attribute indicates that execution of the child node is predicated upon prior execution of its parent node, the child dependency attribute indicates that execution of the parent node is predicated upon prior execution of one of its child nodes and the independent dependency attribute indicates that neither parent nor child node is dependent upon prior execution of any other node.

16. The computer system of claim 15, wherein said hierarchical nodal structure is stored in one of a relational and object-oriented database stored in said at least one data storage device.

17. The computer system of claim 15, wherein the plurality of data structures are stored in one of a relational and object-oriented database stored in said at least one data storage device.

\* \* \* \* \*